US012655768B2

(12) United States Patent
Jang et al.

(10) Patent No.: US 12,655,768 B2
(45) Date of Patent: Jun. 16, 2026

(54) TURBINE COMPONENT HAVING PIN-FIN COOLING STRUCTURE, AND GAS TURBINE INCLUDING SAME

(71) Applicants: DOOSAN ENERBILITY CO., LTD., Changwon-si (KR); University Industry Foundation, Yonsei University, Seoul (KR)

(72) Inventors: Yun Chang Jang, Changwon-si (KR); Jeong Ju Kim, Seongnam-si (KR); Ki Don Lee, Gimhae-si (KR); Hyung Hee Cho, Seoul (KR); Gyeong Ryun Kim, Seoul (KR); Jae Hyeong Kim, Seoul (KR)

(73) Assignees: DOOSAN ENERBILITY CO., LTD., Changwon-si (KR); University Industry Foundation, Yonsei University, Seoul (KR)

( * ) Notice: Subject to any disclaimer, the term of this patent is extended or adjusted under 35 U.S.C. 154(b) by 0 days.

(21) Appl. No.: 18/977,913

(22) Filed: Dec. 11, 2024

(65) Prior Publication Data

US 2025/0237145 A1 Jul. 24, 2025

(30) Foreign Application Priority Data

Jan. 23, 2024 (KR) ........................ 10-2024-0010101

(51) Int. Cl.
*F01D 5/18* (2006.01)

(52) U.S. Cl.
CPC .... *F01D 5/187* (2013.01); *F05D 2260/22141* (2013.01)

(58) Field of Classification Search
CPC .......... F01D 25/12; F01D 5/186; F01D 5/187; F05D 2240/127; F05D 2260/2212; F05D 2260/22141
See application file for complete search history.

(56) References Cited

U.S. PATENT DOCUMENTS 4,638,858 A 1/1987 Chu
6,554,571 B1 * 4/2003 Lee ........................ F01D 5/187 416/97 R (Continued)

FOREIGN PATENT DOCUMENTS

CN 113309578 A 8/2021
JP 2005-147132 A 6/2005

(Continued)

OTHER PUBLICATIONS

Extended European Search Report received for European Application No. 24220140.8, mailed on Mar. 17, 2025, 12 pages.

*Primary Examiner* — Courtney D Heinle
*Assistant Examiner* — Andrew Thanh Bui
(74) *Attorney, Agent, or Firm* — SHOOK, HARDY & BACON L.L.P.

(57) ABSTRACT

An airfoil of a turbine blade or turbine vane includes a coolant flow cavity formed in an inner trailing edge of the airfoil, and a plurality of pin-fin cooling structures formed to abut against opposite inner sides of the coolant flow cavity, the pin-fin cooling structures each including a cooling fin connected between the opposite inner sides to the coolant flow cavity, and a pair of guide fins formed on opposite sides of the cooling fin so as to be spaced a predetermined distance apart from each other to surround the cooling fin.

23 Claims, 11 Drawing Sheets

(56) References Cited

U.S. PATENT DOCUMENTS

| | | | | |
|---|---|---|---|---|
| 6,984,101 | B2 * | 1/2006 | Schiavo, Jr. | F01D 5/187<br>415/115 |
| 8,668,453 | B2 * | 3/2014 | Lee | F01D 5/187<br>416/96 R |
| 10,358,978 | B2 * | 7/2019 | Mongillo | F01D 25/12 |
| 11,428,166 | B2 * | 8/2022 | Stafford | F02C 7/12 |
| 11,454,137 | B1 * | 9/2022 | Chong | F01D 25/26 |
| 2005/0281673 | A1 | 12/2005 | Draper et al. | |
| 2013/0108416 | A1 | 5/2013 | Piggush et al. | |
| 2013/0243575 | A1 * | 9/2013 | Zelesky | F01D 5/186<br>415/116 |
| 2016/0169000 | A1 | 6/2016 | King et al. | |
| 2018/0045059 | A1 * | 2/2018 | Lee | F01D 5/189 |
| 2020/0102839 | A1 | 4/2020 | Heneveld | |
| 2020/0325782 | A1 * | 10/2020 | Maltson | F01D 5/187 |
| 2021/0156264 | A1 | 5/2021 | Richerson et al. | |

FOREIGN PATENT DOCUMENTS

| | | | |
|---|---|---|---|
| JP | 2006-283763 | A | 10/2006 |
| JP | 2009-041433 | A | 2/2009 |
| JP | 2010-174688 | A | 8/2010 |
| JP | 2011513636 | A | 4/2011 |
| JP | 2013-124630 | A | 6/2013 |
| JP | 2020513083 | A | 4/2020 |
| KR | 2006-0053869 | A | 5/2006 |
| KR | 2017-0093728 | A | 8/2017 |
| KR | 2018-0065728 | A | 6/2018 |
| KR | 10-2376052 | B1 | 11/2019 |
| KR | 2020-0047979 | A | 5/2020 |
| KR | 20200069876 | A | 6/2020 |
| KR | 2022-0101510 | A | 7/2022 |

* cited by examiner

TURBINE COMPONENT HAVING PIN-FIN COOLING STRUCTURE, AND GAS TURBINE INCLUDING SAME

CROSS-REFERENCE TO RELATED APPLICATIONS

The present application claims priority to Korean Patent Application No. 10-2024-0010101, filed on Jan. 23, 2024, the entire contents of which are incorporated herein for all purposes by this reference.

BACKGROUND

1. Technical Field

The present disclosure relates to a turbine component having a pin-fin cooling structure, and a gas turbine including the same.

2. Description of the Related Art

Generally, turbines, such as steam turbines, gas turbines, and the like, are machines that obtain rotating force with impulsive force using a flow of a compressed fluid such as gas.

The gas turbine generally includes a compressor, a combustor, and a turbine. The compressor has a compressor housing in which compressor vanes and compressor blades are alternately arranged, along with an air inlet.

The combustor serves to supply fuel to compressed air from the compressor and ignite the air-fuel gas with a burner to produce high temperature and high pressure combustion gas.

The turbine has a turbine housing in which turbine vanes and turbine blades are alternately arranged. A rotor is centrally disposed through the compressor, the combustor, the turbine, and an exhaust chamber.

The rotor is rotatably supported by bearings at opposite ends thereof. A plurality of disks is fixed to the rotor so that respective blades are attached thereto, and a driving shaft of a driving unit, such as a generator or the like, is coupled to an end side of the rotor on the exhaust chamber side.

Since such a gas turbine is devoid of a reciprocating mechanism such as a piston of a 4-stroke engine, there are no friction-causing features such as piston-cylinder contact parts, and thus the turbine has advantages of a significant reduction in lubricant consumption and amplitude of vibration, which is a are characteristic of a reciprocating mechanism, whereby high speed movement is enabled.

Briefly explaining the operation of the gas turbine, air compressed by the compressor is mixed with fuel and combusted in the combustor to provide hot combustion gas, which is then injected towards the turbine. As the injected combustion gas passes through the turbine vanes and the turbine blades, a rotating force is created and the rotor rotates.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine component having a pin-fin cooling structure arranged in a cooling flow path to provide excellent heat transfer performance, and a gas turbine including the same.

An aspect of the present disclosure provides an airfoil of a turbine blade or turbine vane including: a coolant flow cavity formed in an inner trailing edge of the airfoil; and a plurality of pin-fin cooling structures formed to abut against opposite inner sides of the coolant flow cavity, the pin-fin cooling structures each including a cooling fin connected between the opposite inner sides to the coolant flow cavity, and a pair of guide fins formed on opposite sides of the cooling fin so as to be spaced a predetermined distance apart from each other to surround the cooling fin.

The cooling fin may be formed as a column, and the guide fin may be formed as an arcuate rib disposed at a predetermined angular range from a center of the column.

The pair of guide fins may be formed to have a height (h) of one-third to one-sixth of a diameter (D) of the cooling fin such that a first pair of guide fins is arranged to abut against one side of the coolant flow cavity and a second pair of guide fins is arranged to abut against the other side of the coolant flow cavity.

The pair of guide fins may be arranged such that an angle (a) defined from the center of the column between an upstream end and a downstream end in the coolant flow cavity in an air-flow direction ranges from 80 to 100 degrees.

The pair of guide fins may be arranged such that an angle (2b) between the upstream ends is greater than an angle (2c) between the downstream ends.

The pair of guide fins may be formed to have a width (w) of ⅓ to ⅙ of the diameter (D) of the cooling fin.

The cooling fin may be formed as a column, and the guide fin may be formed as an arcuate rib arranged at a predetermined angle range downstream of a plane perpendicular to an air-flow direction and through the center of the column.

The pair of guide fins may be arranged such that an angle (a) defined downstream of the plane ranges from 50 to 65 degrees.

The pair of guide fins may be arranged such that a distance (L) from the center of the column to a widthwise center of the guide fin is 1.0 to 2.0 times the diameter (D) of the cooling fin.

The pair of guide fins may be formed to have a width (w) of ⅓ to ⅙ of the diameter (D) of the cooling fin.

The cooling fin may be formed as a column, and the guide fin may include a curved rib part formed as an arcuate rib arranged at a predetermined angle range downstream of a plane perpendicular to an air-flow direction and through the center of the column, wherein a downstream extension extends from a downstream end of the curved rib part at an angle bent opposite to the curved rib part at a downstream inflection point of the curved rib part.

The curved rib part may be arranged such that an angle (a) defined from the plane and the downstream inflection point ranges from 50 to 65 degrees.

The pair of guide fins may be arranged such that a distance (L) from the center of the column to a widthwise center of the guide fin is 1.0 to 2.0 times the diameter (D) of the cooling fin.

The pair of guide fins may be formed to have a width (w) of ⅓ to ⅙ of the diameter (D) of the cooling fin.

The cooling fin may be formed as a column, and the guide fin may include a curved rib part formed as an arcuate rib arranged at a predetermined angle range downstream of a plane perpendicular to an air-flow direction and through the center of the column, an upstream extension extending at a predetermined angle from an upstream end of the curved rib part, and a downstream extension extending from a downstream end of the curved rib part at an angle bent opposite to the curved rib part at a downstream inflection point of the curved rib part.

The curved rib part may be arranged such that an angle (a) defined from the plane and the downstream inflection point ranges from 50 to 65 degrees.

The upstream extension may be arranged upstream of the plane disposed at an angle of 20 to 40 degrees.

The pair of guide fins may be arranged such that a distance (L) from the center of the column to a widthwise center of the guide fin is 1.0 to 2.0 times the diameter (D) of the cooling fin.

The pair of guide fins may be formed to have a width (w) of ⅓ to ⅙ of the diameter (D) of the cooling fin.

Another aspect of the present disclosure provides a turbine vane including: an airfoil; an inner end wall formed on a radially inner side of the airfoil; an outer end wall formed on a radially outer side of the airfoil, the inner end wall and the outer end wall each having an end wall cavity formed therein; and a plurality of pin-fin cooling structures formed to abut against opposite inner sides of the end wall cavities, the pin-fin cooling structures each including a cooling fin connected between the opposite inner sides to the end wall cavities, and a pair of guide fins formed on opposite sides of the cooling fin so as to be spaced a predetermined distance apart from each other to surround the cooling fin.

The cooling fin may be formed as a column, and the guide fin may be formed as an arcuate rib disposed at a predetermined angular range from a center of the column.

A still another aspect of the present disclosure provides a gas turbine including: a compressor configured to compress incoming air; a combustor configured to mix the compressed air with fuel and combust an air-fuel mixture; and a turbine having turbine blades and turbine vanes installed in a turbine housing so that the turbine blades are rotated by combustion gases discharged from the combustor, wherein an airfoil of the turbine blade or turbine vane includes: a coolant flow cavity formed in an inner trailing edge of the airfoil; and a plurality of pin-fin cooling structures formed to abut against opposite inner sides of the coolant flow cavity, the pin-fin cooling structures each including a cooling fin connected between the opposite inner sides to the coolant flow cavity, and a pair of guide fins formed on opposite sides of the cooling fin so as to be spaced a predetermined distance apart from each other to surround the cooling fin.

The cooling fin may be formed as a column, and the guide fin may be formed as an arcuate rib disposed at a predetermined angular range from a center of the column.

According to the turbine component having the pin-fin cooling structure and the gas turbine including the same, the configuration of the guide fin structure around the circular cooling fin allows for elimination of the wake zone and separation zone downstream of the cooling fin and for guidance of the air flow to reduce the secondary flow zone and increase the flow rate due to the guide fin structure, thereby improving the heat transfer performance downstream of the cooling fin.

DETAILED DESCRIPTION

Figure 1:
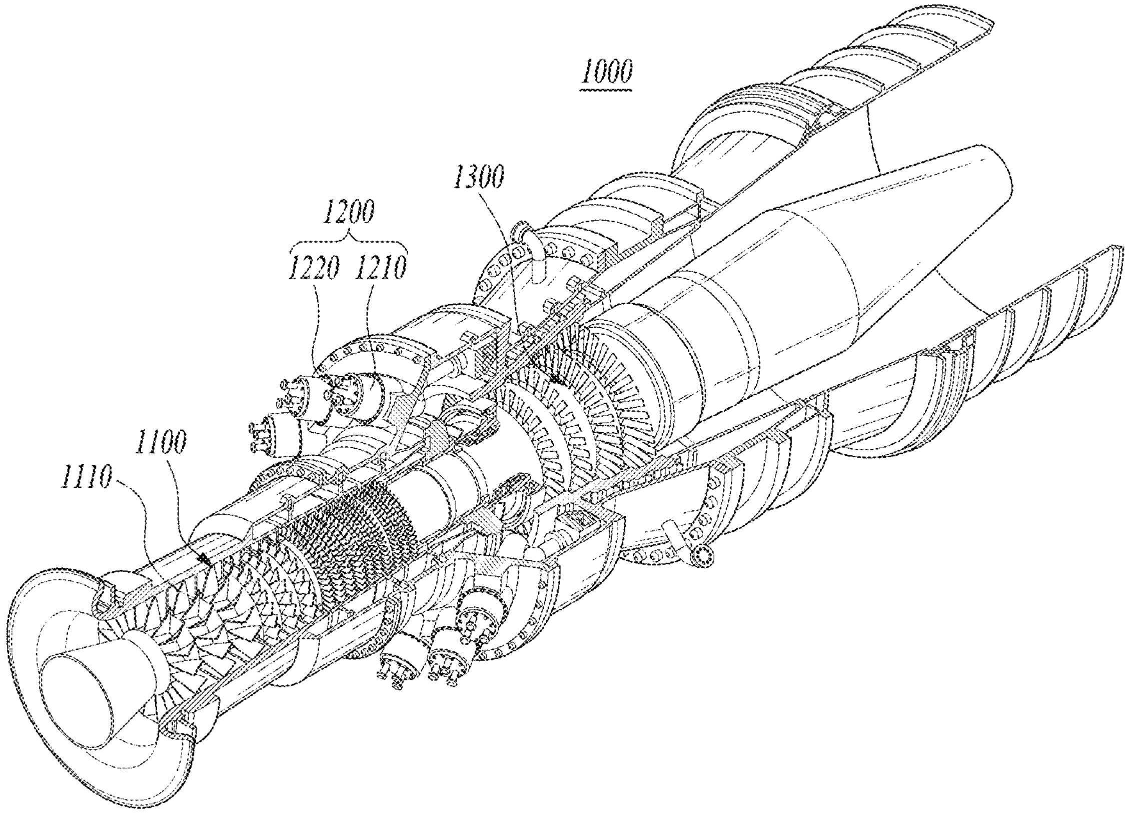
FIG. 1 is a partially cut-away perspective view illustrating a gas turbine according to an embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "including" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
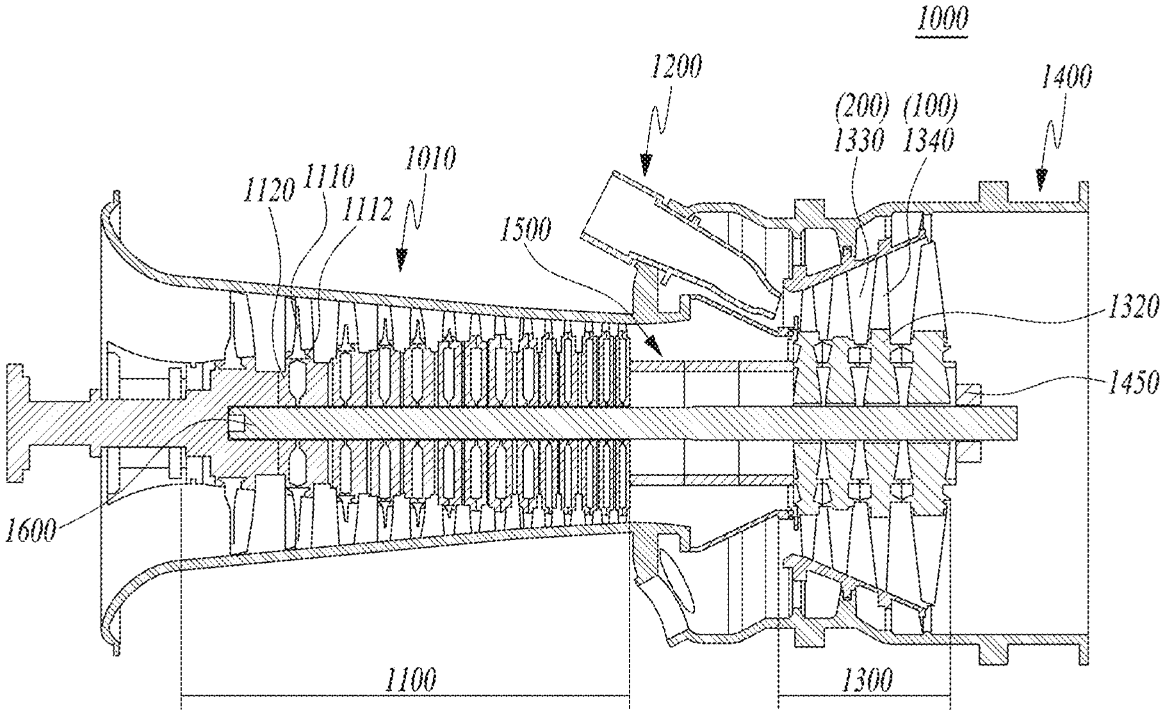
FIG. 2 is a cross-sectional view illustrating a schematic structure of a gas turbine according to an embodiment of the present disclosure.

FIG. 1 is a partially cut-away perspective view illustrating a gas turbine according to an embodiment of the present disclosure, and FIG. 2 is a cross-sectional view illustrating a schematic structure of a gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of blades 1110 radially installed. The compressor 1100 rotates the blade 1110 so that air flows while being compressed by the rotation of the blade 1110. The size and installation angle of the blade 1110 may vary depending on the installation location. In one embodiment, the compressor 1100 is compressed directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor section 1100 is located on the upstream side of the housing 1010, and a turbine section 1300 is located on the downstream side of the housing. A torque tube unit 1500 is disposed as a torque transmission member between the compressor section 1100 and the turbine section 1300 to transmit the rotational torque generated in the turbine section to the compressor section.

The compressor section 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 is radially coupled to an outer circumferential surface of the compressor rotor disk 1120. Each of the blades 1110 has a dovetail part 1112 which is fastened to the compressor rotor disk 1120.

Vanes (not shown) fixed to the housing are respectively positioned between the rotor disks 1120. Unlike the rotor disks, the vanes are fixed to the housing and do not rotate. The vane serves to align a flow of compressed air that has passed through the blades of the compressor rotor disk and guide the air to the blades of the rotor disk located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades to the rotor disk by using other fasteners such as keys or bolts in addition to the fastening shape.

The tie rod 1600 is arranged to pass through the center of the compressor rotor disks 1120 and turbine rotor disks 1320 such that one end thereof is fastened in the compressor rotor disk located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as illustrated in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-temperature and high-pressure combustion gas. With an isobaric combustion process in the compressor, the temperature of the combustion gas is increased to the heat resistance limit that the combustor and the turbine components can withstand.

The combustor consists of a plurality of combustors, which is arranged in the housing formed in a cell shape, and includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The supplied high-temperature and high-pressure combustion gas expands and collides with and provides a reaction force to rotating blades of the turbine to cause a rotational torque, which is then transmitted to the compressor through the torque tube. Here, an excess of power required to drive the compressor is used to drive a generator or the like.

The turbine 1300 is basically similar in structure to the compressor. That is, the turbine 1300 is also provided with a plurality of turbine rotor disks 1320 similar to the compressor rotor disks of the compressor. Thus, the turbine rotor disk 1320 also includes a plurality of turbine blades 1340 disposed radially. The turbine blade 1340 may also be coupled to the turbine rotor disk 1320 in a dovetail coupling manner, for example. Between the blades 1340 of the turbine rotor disk 1320, a turbine vane 1330 fixed to the housing is provided to guide a flow direction of the combustion gas passing through the blades.

Figure 3:
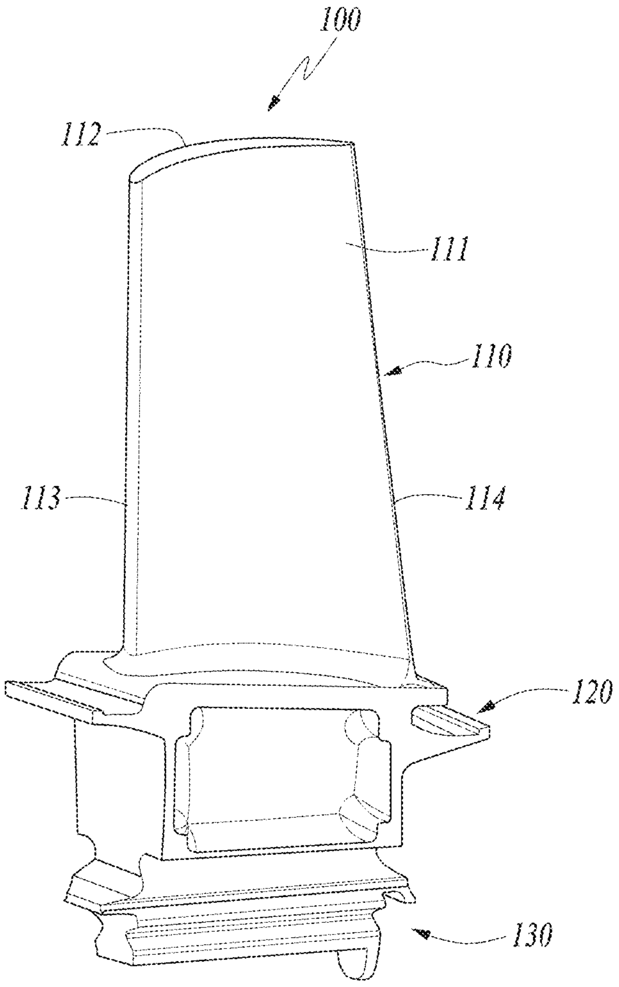
FIG. 3 is a perspective view illustrating a turbine blade according to an embodiment of the present disclosure.

FIG. 3 is a perspective view illustrating a turbine blade according to an embodiment of the present disclosure. In FIG. 3, unlike FIG. 2, the turbine blade is labeled with the reference numeral “100”.

The turbine blade 100 includes an airfoil 110 on an upper side so as to rotate with the pressure of combustion gases, a platform part 120 integrally formed at the bottom of the airfoil, and a root part 130 integrally formed at the bottom of the platform part and coupled to a turbine rotor disk 1320. The platform part may be internally provided with an inlet through which cooling fluid is supplied to an internal flow path formed inside of the airfoil 110.

The airfoil 110 includes a suction surface 112 convexly formed outwardly on one side where combustion gases are introduced, and a pressure surface 111 concavely formed on the opposite side of the suction surface. The front side edge where the pressure surface 111 and the suction surface 112 meet forms a leading edge 113, and the rear side edge forms a trailing edge 114. An internal flow path (not shown) may be formed inside of the airfoil 110 so that cooling air introduced through the inlet may flow therethrough.

The platform part 120 abuts against a platform part 120 of a neighboring turbine blade at a lateral side to maintain spacing between the neighboring blades.

The root part 130 may have an axial-type configuration that is inserted along the axial direction of the turbine rotor disk into an engagement slot formed in the outer circumferential surface of the turbine rotor disk 1320. The root part 130 may have a roughly dovetailed or fir-tree-shaped bend, which may be formed to correspond to the shape of a bend formed in the engagement slot.

Figure 4:
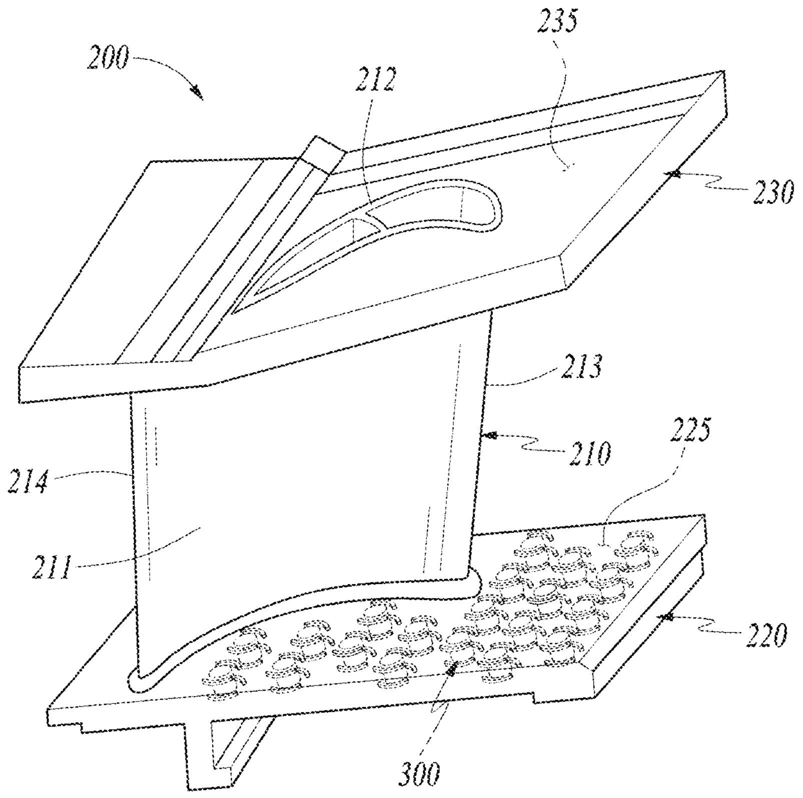
FIG. 4 is a perspective view illustrating a turbine vane according to an embodiment of the present disclosure.

FIG. 4 is a perspective view illustrating a turbine vane according to an embodiment of the present disclosure.

The turbine vane 200 may include an airfoil 210 secured between the turbine blades 100 to guide a flow of combustion gases through the turbine blades, an inner end wall 220 formed on a radially inward side of the airfoil, and an outer end wall 230 formed on a radially outward side of the airfoil.

Like the airfoil 110 of the turbine blade 100, an airfoil 210 of the turbine vane 200 includes a concave pressure surface 211 and an opposing convex suction surface 212, as well as a leading edge 213 and a trailing edge 214.

The inner end wall 220 may be integrally formed on the radially inner side of the airfoil 210 and may be secured within the turbine housing. Inside the inner end wall 220, an end wall cavity 225 may be formed so that air may flow therethrough, and a plurality of pin-fin cooling structures 300 may be formed in the end wall cavity 225. The plurality of pin-fin cooling structures 300 may be arranged around the junction with the airfoil 210 in the end wall cavity 225.

The outer end wall 230 may be integrally formed on the radially outer side of the airfoil 210 and may be secured to the turbine housing. An end wall cavity 235 may also be formed in the interior of the outer end wall 230, and although not illustrated in FIG. 4, a plurality of pin-fin cooling structures 300 may be formed in the end wall cavity 235.

Figure 5:
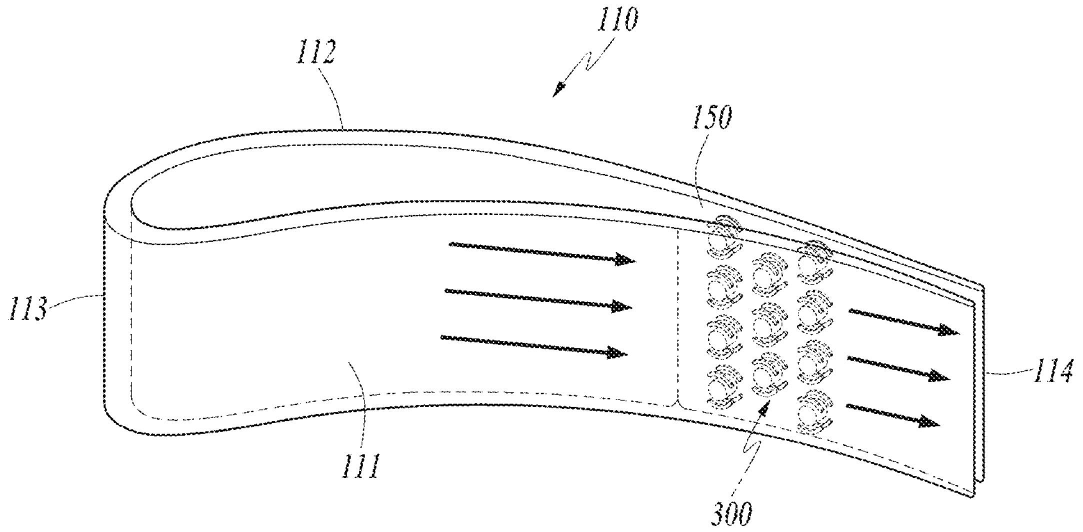
FIG. 5 is a perspective cross-sectional view illustrating an airfoil according to an embodiment of the present disclosure.

FIG. 5 is a perspective cross-sectional view illustrating an airfoil according to an embodiment of the present disclosure. While FIG. 5 illustrates an airfoil 110 of a turbine blade 100, the same configuration may be formed on an airfoil 210 of a turbine vane 200.

The airfoil 110 may include a coolant flow cavity 150 formed at an inner trailing edge, and a plurality of pin-fin cooling structures 300 formed to abut against opposite sides of the coolant flow cavity.

The coolant flow cavity 150 may be formed on the inner trailing edge side of the airfoil 110, allowing cooling air to flow in the direction of the trailing edge 114.

The plurality of pin-fin cooling structures 300 may be integrally formed in a column shape between opposite inner sides of the coolant flow cavity 150. The pin-fin cooling structure 300 may be formed as a pin-type fin. The plurality of pin-fin cooling structures 300 may be arranged in a plurality of rows alternated with each other.

Figure 6:
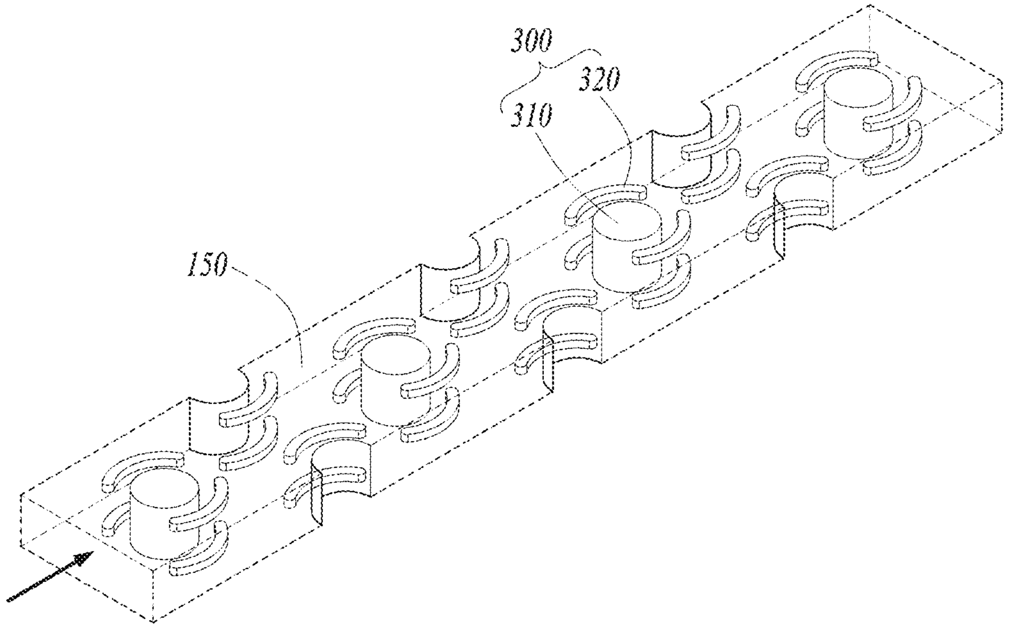
FIG. 6 is a partially sectional perspective view illustrating a coolant flow cavity according to an embodiment of the present disclosure.
Figure 7A:
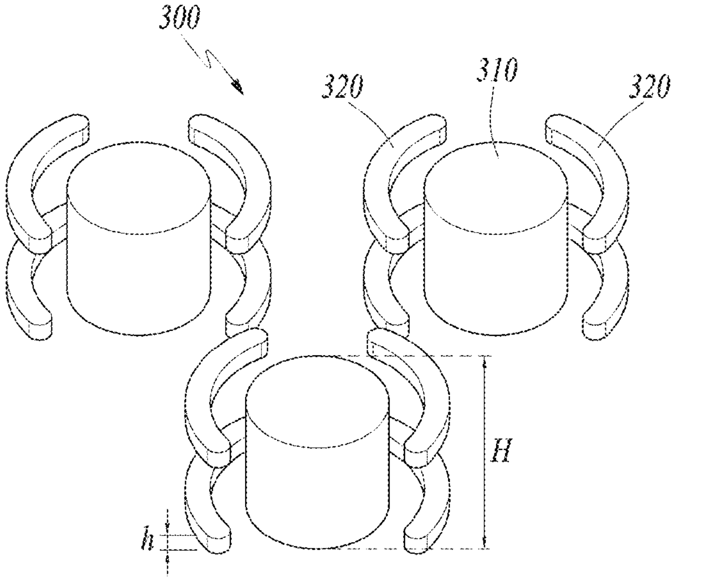
FIG. 7A is a perspective view illustrating a pin-fin cooling structure according to a first embodiment of the present disclosure.
Figure 7B:
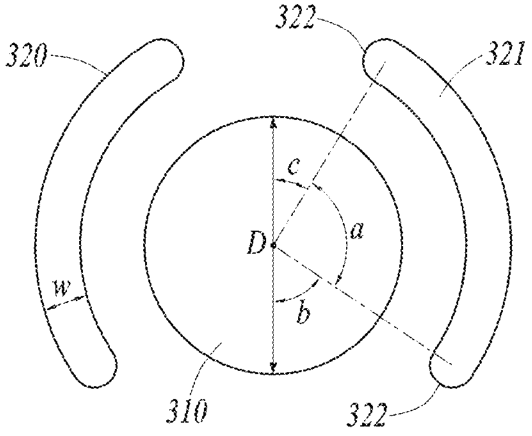
FIG. 7B is a top view illustrating the pin-fin cooling structure according to the first embodiment of the present disclosure.

FIG. 6 is a partially sectional perspective view illustrating a coolant flow cavity according to an embodiment of the present disclosure, FIG. 7A is a perspective view illustrating a pin-fin cooling structure according to a first embodiment of the present disclosure, and FIG. 7B is a top view illustrating the pin-fin cooling structure according to the first embodiment.

The pin-fin cooling structure 300 according to the first embodiment may include a cooling fin 310 connected between opposite inner sides of the coolant flow cavity 150, and a pair of guide fins 320 formed on opposite sides of the cooling fin so as to be spaced a predetermined distance apart from each other to surround the cooling fin.

FIG. 6 illustrates that the top and bottom surfaces of the coolant flow cavity 150 are simplified as planes parallel to each other, but in practice, as illustrated in FIG. 5, the coolant flow cavity 150 may be formed as a curved face with one side and the other side of the cooling fluid cavity 150 disposed at an inclined angle to each other. Also illustrated in FIG. 6 is a pin-fin cooling structure 300, which corresponds to the first embodiment.

The cooling fin 310 may be formed as a column whose top and bottom surfaces may be integrally connected between opposite inner sides of the coolant flow cavity 150.

The pair of guide fins 320 may be spaced a predetermined distance apart from each other on opposite sides of the cooling fin 310 to surround the cooling fin. The pair of guide fins 320 can be laterally symmetrically disposed with respect to a plane passing through the center of the cooling fin 310 and along an air-flow direction to guide the cooling air.

In the first embodiment, the pair of guide fins 320 may be formed as arcuate ribs disposed at a predetermined range of angle from the center of the column. Unlike the cooling fin 310, the guide fins 320 may not be formed in the form of a column, but may be formed in two pairs of pieces, a total of four pieces, each pair connected to opposite sides of the coolant flow cavity 150, at the top and bottom of the cooling fin 310, respectively.

As illustrated in FIGS. 7A and 7B, the two pairs of guide fins 320 may be formed to have a height h of one-third to one-sixth of the diameter D of the cooling fin 310 such that a first pair of guide fins may be arranged to abut against one side of the coolant flow cavity and a second pair of guide fins 320 may be arranged to abut against the other side of the coolant flow cavity 150.

The height H of the cooling fin 310 may be formed similar to a diameter D of the cooling fin 310. The height h of each guide fin 320 may be formed to be about 16.7% to 33.3% of the diameter D or the height H of the cooling fin 310.

The pair of guide fins 320 each may be formed at an angle of 80 to 100 degrees defined between an upstream end to a downstream end in the air-flow direction of the coolant flow cavity from the center of the column. For example, the arcuate rib angle a of the guide fin 320 may be formed at 90 degrees.

The pair of guide fins 320 may be disposed such that the angle 2b defined between the upstream ends in the air-flow direction of the coolant flow cavity is greater than the angle 2c between the downstream ends.

The guide fins 320 may be arranged such that an angle b from the center of the cooling fin 310 defined by the upstream end of the guide fin 320 and the air-flow direction along the center ranges from 50 to 70 degrees. In this case, an angle c from the center of the cooling fin 310 defined by the downstream end of the guide fin 320 and the air-flow direction along the center ranges from 20 to 40 degrees.

The guide fin 320 may be formed to have a width w of ⅓ to ⅙ of the diameter D of the cooling fin 310. In other words, the width w of the guide fin 320 may be formed to be 16.7% to 33.3% of the diameter D of the cooling fin 310.

The guide fin 320 may include a curved rib part 321 with a predetermined angle, height, and width, wherein a pair of semi-circular rounded portions 322 are respectively formed at an upstream end and a downstream end of the curved rib part.

As illustrated in FIG. 7B, an angle a defined from the center of the column between the upstream end and the downstream end of the guide fin 320 may refer to an angle defined between the upstream end to the downstream end of the curved rib part 321.

Since the pair of rounded portions 322 are formed at both ends of the curved rib part 321, a flow of air may be guided smoothly, and since there is no pointed apex, breakage due to stress concentration may be prevented.

Figure 8A:
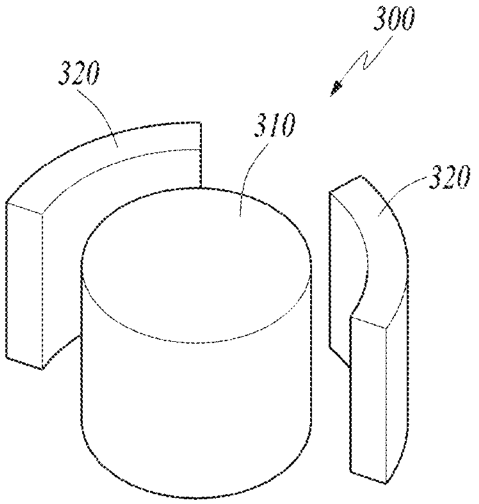
FIG. 8A is a perspective view illustrating a pin-fin cooling structure according to a second embodiment of the present disclosure.
Figure 8B:
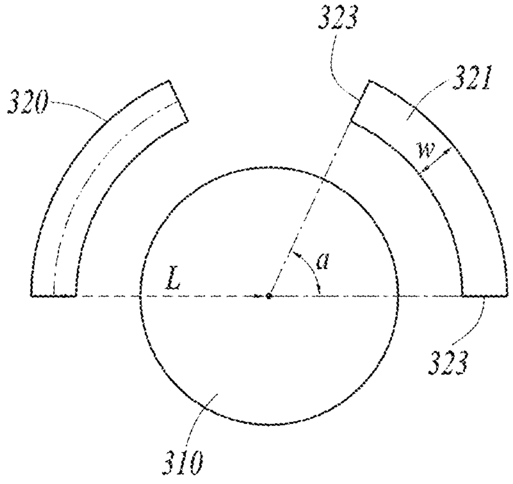
FIG. 8B is a top view illustrating the pin-fin cooling structure according to the second embodiment of the present disclosure.

FIG. 8A is a perspective view illustrating a pin-fin cooling structure according to a second embodiment of the present disclosure, and FIG. 8B is a top view illustrating the pin-fin cooling structure according to the second embodiment of the present disclosure.

The pin-fin cooling structure 300 according to the second embodiment may include a cooling fin 310 connected between opposite inner sides of the coolant flow cavity 150, and a pair of guide fins 320 formed on opposite sides of the cooling fin so as to be spaced a predetermined distance apart from each other to surround the cooling fin.

The cooling fin 310 may be formed in the form of a column, and the guide fins 320 may be formed in the form of arcuate ribs disposed at a predetermined angular range downstream of a plane through the center of the column and perpendicular to the air-flow direction.

In the second embodiment, like the cooling fin 310, the guide fins 320 may be formed in the form of columns connected between opposite inner sides of the coolant flow cavity 150.

The guide fin 320 may include a curved rib part 321 with a predetermined angle, height, and width, wherein a pair of flat portions 323 are respectively formed at an upstream end and a downstream end of the curved rib part so as to be aligned with the center of the column.

As illustrated in FIG. 8B, the guide fin 320 may be disposed downstream of the plane through the center of the column and perpendicular to the air-flow direction at an angle of 50 to 65 degrees. In other words, an angle defined between the upstream ends of the pair of guide fins 320 in the air-flow direction may be 180 degrees, and an angle defined between the downstream ends of the pair of guide fins 320 in the air-flow direction may be 50 to 80 degrees.

The guide fins 320 may be disposed such that the distance L from the center of the column to the widthwise center of the guide fin 320 is 1.0 to 2.0 times the diameter D of the cooling fin. In other words, the distance L from the center of the cooling fin 310 to the widthwise center of the guide fin 320 may be 2 to 4 times the radius of the cooling fin 310.

The guide fins 320 may be formed to have a width w of one-third to one-sixth of the diameter D of the cooling fin 310. In other words, the width w of the guide fins 320 may be formed to be 16.7% to 33.3% of the diameter D of the cooling fin 310.

Since the pair of guide fins 320 is disposed only on the downstream side, the pin-fin cooling structure 300 of the second embodiment may be referred to as a half guide fin.

Figure 9A:
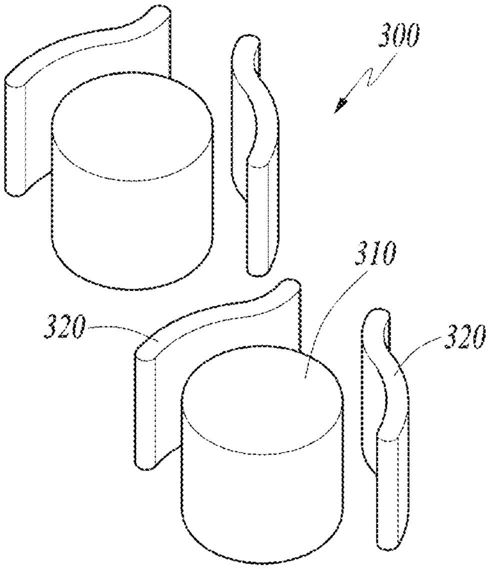
FIG. 9A is a perspective view illustrating a pin-fin cooling structure according to a third embodiment of the present disclosure.
Figure 9B:
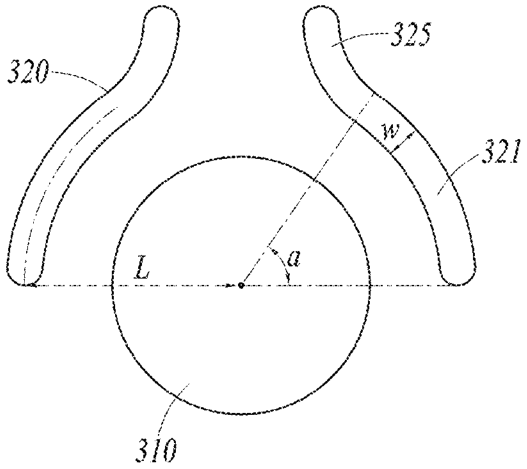
FIG. 9B is a top view illustrating the pin-fin cooling structure according to the third embodiment of the present disclosure.

FIG. 9A is a perspective view illustrating a pin-fin cooling structure according to a third embodiment of the present disclosure, and FIG. 9B is a top view illustrating the pin-fin cooling structure according to the third embodiment of the present disclosure.

The pin-fin cooling structure 300 according to the third embodiment may also include a cooling fin 310 connected between opposite inner sides of the coolant flow cavity 150, and a pair of guide fins 320 formed on opposite sides of the cooling fin so as to be spaced a predetermined distance apart from each other to surround the cooling fin.

The cooling fin 310 may be formed in the form of a column, and the guide fins 320 each may include a curved rib part 321 formed in the form of an arcuate rib disposed at a predetermined angular range downstream of a plane through the center of the column and perpendicular to the air-flow direction, wherein a downstream extension 325 extends from a downstream end the curved rib part at an angle bent opposite to the curved rib part at a downstream inflection point of the curved rib part.

The cooling fin 310 may be formed in the form of a column with a predetermined diameter D and height H.

The upstream end of the curved rib part 321 may be aligned with the plane passing through the center of the column and perpendicular to the air-flow direction, and the downstream end of the curved rib part 321 may be disposed at a predetermined angle a from the center of the column with respect to the plane.

The downstream extension 325 may be formed to bend outwardly from the downstream end of the curved rib part 321 to have a predetermined radius of curvature. The length of the downstream extension 325 may be formed to be ⅓ to ½ times the curved rib part 321. The radius of curvature of the downstream extension 325 may be formed to be smaller than that of the curved rib part 321.

The curved rib part 321 may be disposed such that an angle a from the center of the column defined by the downstream inflection point and the plane passing through the center of the column and perpendicular to the air-flow direction ranges from 50 to 65 degrees. In other words, an angle between the upstream ends of the pair of curved rib parts 321 in the air-flow direction may be 180 degrees, and an angle between the downstream ends of the pair of guide fins 320 may be 50 to 80 degrees. The angle between the downstream ends of the pair of downstream extensions 325 may be smaller than the angle between the downstream ends of the pair of guide fins 320.

The guide fins 320 may be disposed such that the distance L from the center of the column to the widthwise center of the guide fin 320 is 1.0 to 2.0 times the diameter D of the cooling fin. In other words, the distance L from the center of the cooling fin 310 to the widthwise center of the guide fin 320 may be 2 to 4 times the radius of the cooling fin 310.

The guide fins 320 may be formed to have a width w of one-third to one-sixth of the diameter D of the cooling fin 310. In other words, the width w of the guide fins 320 may be formed to be 16.7% to 33.3% of the diameter D of the cooling fin 310.

Since the pair of guide fins 320 is disposed in a horseshoe shape only on the downstream side, the pin-fin cooling structure 300 of the third embodiment may be referred to as a half horseshoe guide fin.

Figure 10A:
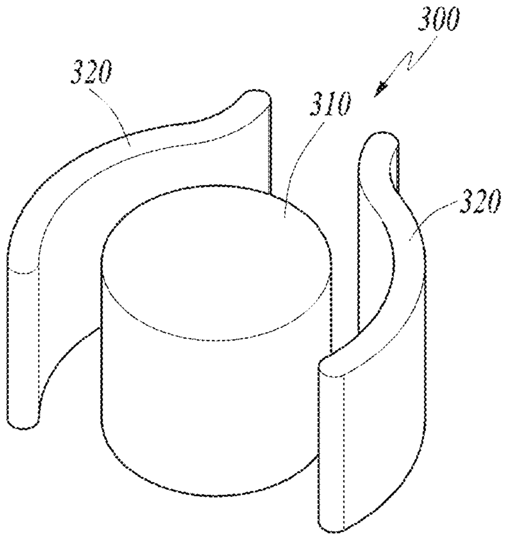
FIG. 10A is a perspective view illustrating a pin-fin cooling structure according to a fourth embodiment of the present disclosure.
Figure 10B:
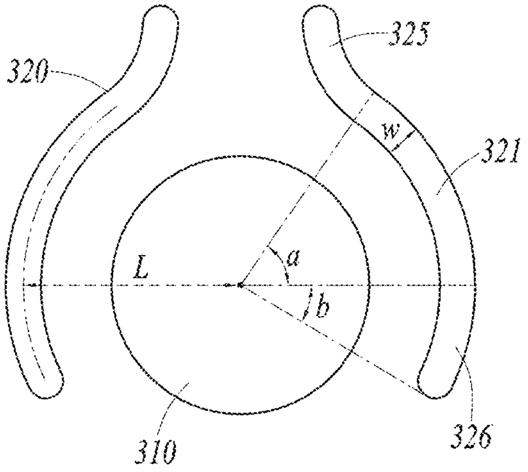
FIG. 10B is a top view illustrating the pin-fin cooling structure according to the fourth embodiment of the present disclosure.

FIG. 10A is a perspective view illustrating a pin-fin cooling structure according to a fourth embodiment of the present disclosure, and FIG. 10B is a top view illustrating the pin-fin cooling structure according to the fourth embodiment of the present disclosure.

The pin-fin cooling structure 300 according to the fourth embodiment may also include a cooling fin 310 connected between opposite inner sides of the coolant flow cavity 150, and a pair of guide fins 320 formed on opposite sides of the cooling fin so as to be spaced a predetermined distance apart from each other to surround the cooling fin.

The cooling fin 310 may be formed in the form of a column, and the guide fins 320 each may include a curved rib part 321 formed in the form of an arcuate rib disposed at a predetermined angular range downstream of a plane through the center of the column and perpendicular to the air-flow direction, an upstream extension 326 extending at a predetermined angle from an upstream end of the curved rib part, and a downstream extension 325 extending from a downstream end the curved rib part at an angle bent opposite to the curved rib part at a downstream inflection point of the curved rib part.

The cooling fin 310 may be formed in the form of a column with a predetermined diameter D and height H.

The upstream end of the curved rib part 321 may be aligned with the plane passing through the center of the column and perpendicular to the air-flow direction, and the downstream end of the curved rib part 321 may be disposed at a predetermined angle a from the center of the column with respect to the plane.

The upstream extension 326 may extend a predetermined length with the same radius of curvature from the upstream end of the curved rib part 321.

The downstream extension 325 may be formed to bend outwardly from the downstream end of the curved rib part 321 to have a predetermined radius of curvature. The length of the downstream extension 325 may be formed to be ⅓ to ½ times the curved rib part 321. The radius of curvature of the downstream extension 325 may be formed to be smaller than that of the curved rib part 321.

The curved rib part 321 may be disposed such that an angle a from the center of the column defined by the downstream inflection point and the plane passing through the center of the column and perpendicular to the air-flow direction ranges from 50 to 65 degrees. In other words, an angle between the upstream ends of the pair of curved rib parts 321 in the air-flow direction may be 180 degrees, and an angle between the downstream ends of the pair of guide fins 320 may be 50 to 80 degrees. The angle between the downstream ends of the pair of downstream extensions 325 may be smaller than the angle between the downstream ends of the pair of guide fins 320.

An angle b of the upstream extension 326 defined upstream from the plane through the center of the column and perpendicular to the air-flow direction may range from 20 to 40 degrees. Accordingly, an angle between the upstream ends of the pair of upstream extensions 326 may range from 100 to 140 degrees.

The guide fins 320 may be disposed such that the distance L from the center of the column to the widthwise center of the guide fin 320 is 1.0 to 2.0 times the diameter D of the cooling fin. In other words, the distance L from the center of the cooling fin 310 to the widthwise center of the guide fin 320 may be 2 to 4 times the radius of the cooling fin 310.

The guide fins 320 may be formed to have a width w of one-third to one-sixth of the diameter D of the cooling fin 310. In other words, the width w of the guide fins 320 may be formed to be 16.7% to 33.3% of the diameter D of the cooling fin 310.

Since the pair of guide fins 320 is disposed in a horseshoe shape, the pin-fin cooling structure 300 of the fourth embodiment may be referred to as a horseshoe guide fin.

Figure 11A:
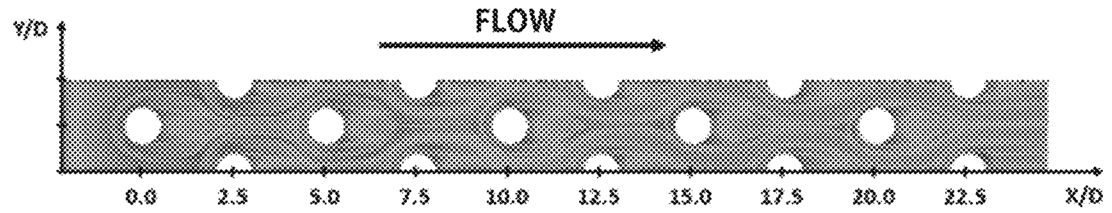
FIG. 11A is a diagram illustrating the heat transfer characteristics of a pin-fin cooling structure according to the related art.
Figure 11B:
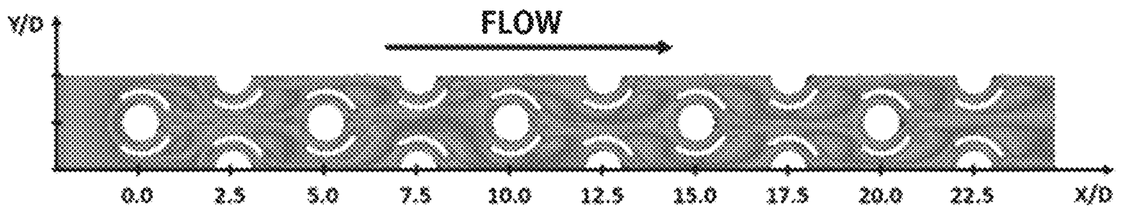
FIG. 11B is a diagram illustrating the heat transfer characteristics of the pin-fin cooling structure according to the first embodiment of the present disclosure.
Figure 11C:
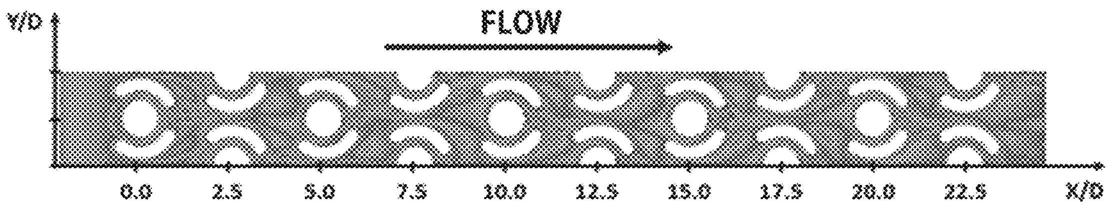
FIG. 11C is a diagram illustrating the heat transfer characteristics of the pin-fin cooling structure according to the first embodiment of the present disclosure.
Figure 12A:
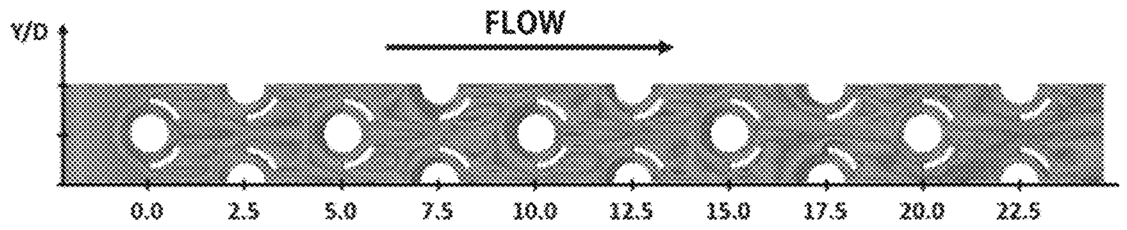
FIG. 12A is a diagram illustrating the heat transfer characteristics of the pin-fin cooling structure according to the second embodiment of the present disclosure.
Figure 12B:
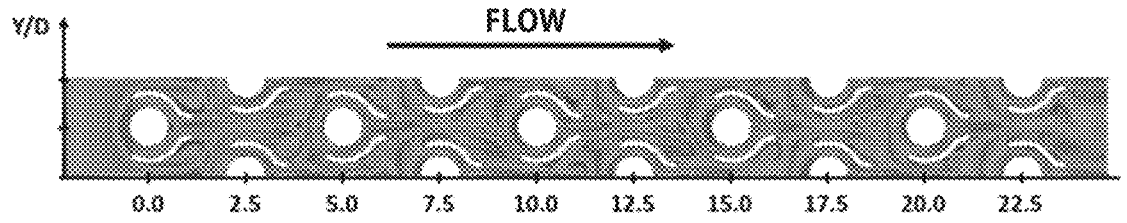
FIG. 12B is a diagram illustrating heat transfer characteristics of the pin-fin cooling structure according to the fourth embodiment of the present disclosure.
Figure 12C:
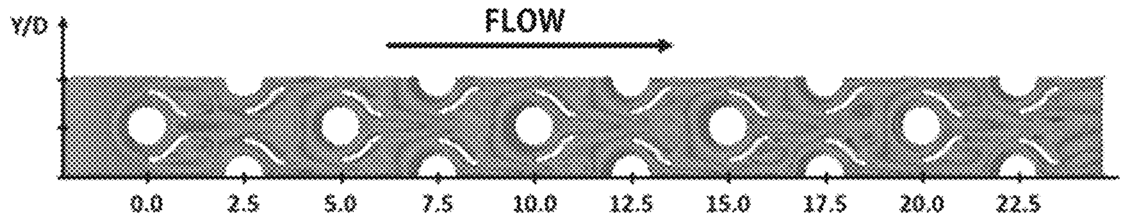
FIG. 12C is a diagram illustrating heat transfer characteristics of the pin-fin cooling structure according to the third embodiment of the present disclosure.
Figure 12D:
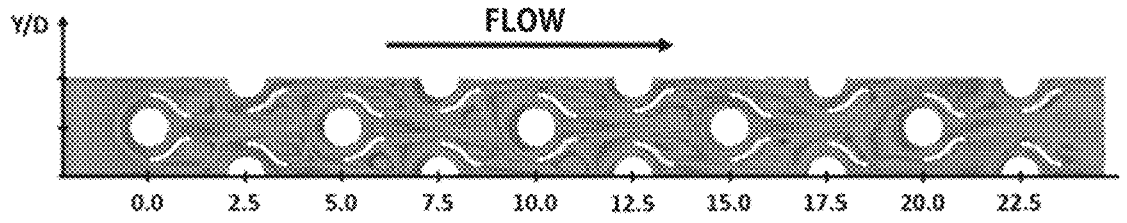
FIG. 12D is a diagram illustrating heat transfer characteristics of the pin-fin cooling structure according to the third embodiment of the present disclosure.
Figure 13:
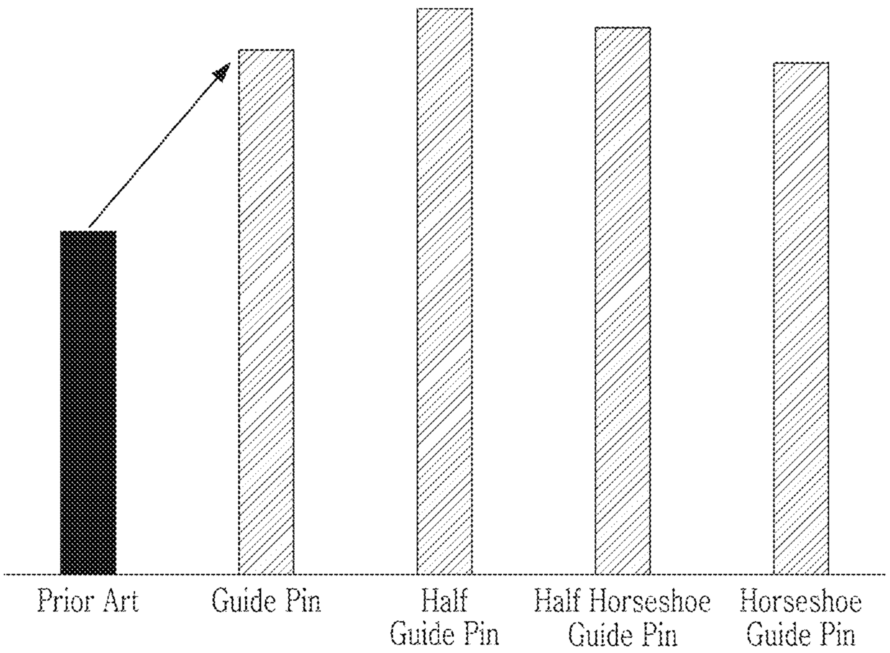
FIG. 13 is a graph illustrating the heat transfer performance of the pin-fin cooling structures according to the related art and embodiments of the present disclosure.

FIG. 11A is a diagram illustrating the heat transfer characteristics of a pin-fin cooling structure according to the related art, FIGS. 11B and 11C are diagrams illustrating the heat transfer characteristics of the pin-fin cooling structure according to the first embodiment of the present disclosure, FIGS. 12A to 12D are diagrams illustrating the heat transfer characteristics of the pin-fin cooling structure according to the second to fourth embodiments of the present disclosure, and FIG. 13 is a graph illustrating the heat transfer performance of the pin-fin cooling structures according to the related art and embodiments of the present disclosure.

In FIG. 11A, the related art pin-fin structures have only columnar cooling fins alternated with each other from row to row. FIGS. 11B and 11C illustrate the pin-fin cooling structure according to the first embodiment of the present disclosure including a cooling fin and two pairs of guide fins, wherein FIG. 11B shows the case in which the width w of the arcuate ribbed guide fins is ⅙ of the height of the cooling fin, and FIG. 11C shows the case in which the width w of the guide fin is ⅓ of the height of the cooling fin.

FIG. 12A shows the Half Guide Fin Model of the second embodiment, FIG. 12B shows the Horseshoe Guide Fin Model of the fourth embodiment, FIG. 12C shows the Half Horseshoe Guide Fin Model of the third embodiment, wherein the angle a of the curved rib part 321 is 57.5 degrees, and FIG. 12D shows the detailed flow structure when the angle a is 55 degrees.

For the related art pin-fin structure, increased heat transfer due to collisions upstream of the circular fin and decreased heat transfer due to vortices downstream of the circular fin are well shown.

According to the pin-fin cooling structure of the present disclosure, the guide fin structure around the circular fin may be utilized to further enhance the heat transfer upstream of the circular fin and eliminate the vortices and separation areas in the downstream part with less heat transfer, which contributes to the increase in average heat transfer.

As illustrated in FIG. 13, it can be seen that the pin-fin cooling structure of the present disclosure improves the heat transfer performance by more than 40% compared to the related art.

According to the turbine component having the pin-fin cooling structure and the gas turbine including the same, the configuration of the guide fin structure around the circular cooling fin allows for elimination of the wake zone and separation zone downstream of the cooling fin and for guidance of the air flow to reduce the secondary flow zone and increase the flow rate due to the guide fin structure, thereby improving the heat transfer performance downstream of the cooling fin.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

The invention claimed is:

1. An airfoil of a turbine blade or turbine vane, the airfoil comprising:
- a coolant flow cavity formed in an inner trailing edge of the airfoil; and
- a plurality of pin-fin cooling structures formed to abut against opposite inner sides of the coolant flow cavity, the pin-fin cooling structures each comprising:
- a cooling fin connected between the opposite inner sides to the coolant flow cavity, and
- a pair of guide fins formed on opposite sides of the cooling fin so as to be spaced a predetermined distance apart from each other to surround the cooling fin.

2. The airfoil of claim 1, wherein the cooling fin is formed as a column, and the guide fin is formed as an arcuate rib disposed at a predetermined angular range from a center of the column.

3. The airfoil of claim 2, wherein the pair of guide fins is formed to have a height (h) of one-third to one-sixth of a diameter (D) of the cooling fin such that a first pair of guide fins is arranged to abut against one side of the coolant flow cavity and a second pair of guide fins is arranged to abut against the other side of the coolant flow cavity.

4. The airfoil of claim 3, wherein the pair of guide fins is arranged such that an angle (a) defined from the center of the column between an upstream end and a downstream end in the coolant flow cavity in an air-flow direction ranges from 80 to 100 degrees.

5. The airfoil of claim 4, wherein the pair of guide fins is arranged such that an angle (2b) between the upstream ends is greater than an angle (2c) between the downstream ends.

6. The airfoil of claim 3, wherein the pair of guide fins is formed to have a width (w) of ⅓ to ⅙ of the diameter (D) of the cooling fin.

7. The airfoil of claim 1, wherein the cooling fin is formed as a column, and the guide fin is formed as an arcuate rib arranged at a predetermined angle range downstream of a plane perpendicular to an air-flow direction and through the center of the column.

8. The airfoil of claim 7, wherein the pair of guide fins is arranged such that an angle (a) defined downstream of the plane ranges from 50 to 65 degrees.

9. The airfoil of claim 8, wherein the pair of guide fins is arranged such that a distance (L) from the center of the column to a widthwise center of the guide fin is 1.0 to 2.0 times the diameter (D) of the cooling fin.

10. The airfoil of claim 8, wherein the pair of guide fins is formed to have a width (w) of ⅓ to ⅙ of the diameter (D) of the cooling fin.

11. The airfoil of claim 1, wherein the cooling fin is formed as a column, and the guide fin comprises:
- a curved rib part formed as an arcuate rib arranged at a predetermined angle range downstream of a plane perpendicular to an air-flow direction and through the center of the column, wherein a downstream extension extends from a downstream end of the curved rib part at an angle bent opposite to the curved rib part at a downstream inflection point of the curved rib part.

12. The airfoil of claim 11, wherein the curved rib part is arranged such that an angle (a) defined from the plane and the downstream inflection point ranges from 50 to 65 degrees.

13. The airfoil of claim 12, wherein the pair of guide fins is arranged such that a distance (L) from the center of the column to a widthwise center of the guide fin is 1.0 to 2.0 times the diameter (D) of the cooling fin.

14. The airfoil of claim 12, wherein the pair of guide fins is formed to have a width (w) of ⅓ to ⅙ of the diameter (D) of the cooling fin.

15. The airfoil of claim 1, wherein the cooling fin is formed as a column, and the guide fin comprises:
- a curved rib part formed as an arcuate rib arranged at a predetermined angle range downstream of a plane perpendicular to an air-flow direction and through the center of the column;
- an upstream extension extending at a predetermined angle from an upstream end of the curved rib part; and
- a downstream extension extending from a downstream end of the curved rib part at an angle bent opposite to the curved rib part at a downstream inflection point of the curved rib part.

16. The airfoil of claim 15, wherein the curved rib part is arranged such that an angle (a) defined from the plane and the downstream inflection point ranges from 50 to 65 degrees.

17. The airfoil of claim 16, wherein the upstream extension is arranged upstream of the plane disposed at an angle of 20 to 40 degrees.

18. The airfoil of claim 16, wherein the pair of guide fins is arranged such that a distance (L) from the center of the column to a widthwise center of the guide fin is 1.0 to 2.0 times the diameter (D) of the cooling fin.

19. The airfoil of claim 16, wherein the pair of guide fins is formed to have a width (w) of ⅓ to ⅙ of the diameter (D) of the cooling fin.

20. A turbine vane comprising:
- an airfoil;
- an inner end wall formed on a radially inner side of the airfoil;
- an outer end wall formed on a radially outer side of the airfoil, the inner end wall and the outer end wall each having an end wall cavity formed therein; and
- a plurality of pin-fin cooling structures formed to abut against opposite inner sides of the end wall cavities, the pin-fin cooling structures each comprising:

a cooling fin connected between the opposite inner sides to the end wall cavities; and a pair of guide fins formed on opposite sides of the cooling fin so as to be spaced a predetermined distance apart from each other to surround the cooling fin.

21. The turbine vane of claim 20, wherein the cooling fin is formed as a column, and the guide fin is formed as an arcuate rib disposed at a predetermined angular range from a center of the column.

22. A gas turbine comprising:

a compressor configured to compress incoming air;

a combustor configured to mix the compressed air with fuel and combust an air-fuel mixture; and a turbine having turbine blades and turbine vanes installed in a turbine housing so that the turbine blades are rotated by combustion gases discharged from the combustor, wherein an airfoil of the turbine blade or turbine vane comprises:

a coolant flow cavity formed in an inner trailing edge of the airfoil; and a plurality of pin-fin cooling structures formed to abut against opposite inner sides of the coolant flow cavity, the pin-fin cooling structures each comprising:

a cooling fin connected between the opposite inner sides to the coolant flow cavity, and a pair of guide fins formed on opposite sides of the cooling fin so as to be spaced a predetermined distance apart from each other to surround the cooling fin.

23. The gas turbine of claim 22, wherein the cooling fin is formed as a column, and the guide fin is formed as an arcuate rib disposed at a predetermined angular range from a center of the column.

* * * * *